US 8,915,981 B2

(12) United States Patent
Marker et al.

(10) Patent No.: US 8,915,981 B2
(45) Date of Patent: Dec. 23, 2014

(54) METHOD FOR PRODUCING METHANE FROM BIOMASS

(75) Inventors: Terry L. Marker, Palos Heights, IL (US); Larry G. Felix, Pelham, AL (US); Martin B. Linck, Mount Prospect, IL (US); Howard S. Meyer, Hoffman Estates, IL (US); Dennis Leppin, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 995 days.

(21) Appl. No.: 12/815,743

(22) Filed: Jun. 15, 2010

(65) Prior Publication Data

US 2010/0251615 A1 Oct. 7, 2010

Related U.S. Application Data

(63) Continuation-in-part of application No. 12/419,535, filed on Apr. 7, 2009.

(51) Int. Cl.
*C01B 3/36* (2006.01)
*C01B 3/34* (2006.01)
(Continued)

(52) U.S. Cl.
CPC ........... *C10L 3/08* (2013.01); *C01B 2203/1247* (2013.01); *C01B 3/34* (2013.01);
(Continued)

(58) Field of Classification Search
CPC ............ C10G 1/00; C10G 1/08; C10G 1/086; C10G 2300/1011; C10G 2300/1018; C10G 2300/4018; C10G 2400/02; C10G 2400/28; C10G 3/00; C10G 3/47; C10G 45/02; C10G 1/045; C10G 1/083; C10G 2300/1003; C10B 53/02; C10B 49/10; C10B 49/14; C10B 49/20; C10B 49/22; C10B 51/00; C10B 55/10; C10B 57/08; C10B 57/12; Y02E 50/14; Y02E 50/32; Y02E 20/16; Y02E 20/18; Y02E 50/10; Y02E 50/30; Y02E 50/343; Y02E 60/36; Y02E 60/364; C01B 2203/0283; C01B 2203/043; C01B 2203/0811; C01B 13/0251; C01B 2203/0233; C01B 2203/0495; C01B 2203/141; C01B 2203/143; C01B 2203/1614; C01B 2203/86; C01B 2210/0046; C01B 3/382; C01B 2203/0205; C01B 2203/042; C01B 2203/0475; C01B 2203/0827; C01B 2203/1241; C01B 2203/1247; C01B 2203/1258; C01B 2203/148; C01B 31/02; C01B 3/025; C01B 3/042; C01B 3/068; C01B 3/08

See application file for complete search history.

(56) References Cited

U.S. PATENT DOCUMENTS 3,625,664 A 12/1971 Padovani
(Continued)

FOREIGN PATENT DOCUMENTS

CN 1473188 A 2/2004
(Continued)

OTHER PUBLICATIONS

Sephton, M. A. et al., "Hydropyrolysis of High Molecular Weight Organic Matter in Murchison", Lunar and Planetary Science XXXIV, 2003.
(Continued)

*Primary Examiner* — Imran Akram
(74) *Attorney, Agent, or Firm* — Banner & Witcoff, Ltd.

(57) ABSTRACT

A multi-stage method and apparatus for producing methane from biomass in which the biomass is hydropyrolyzed in a reactor vessel containing molecular hydrogen and a deoxygenating catalyst, the output of which is hydrogenated using a hydroconversion catalyst. The output from the hydroconversion step is provided to a water-gas-shift process providing a mixture of $H_2O$ and product gases including $CO_2$, $H_2$, and methane. The mixture components are separated, resulting in a product stream comprising substantially only methane.

26 Claims, 2 Drawing Sheets

(51) Int. Cl.
*C10B 49/10* (2006.01)
*C10J 3/46* (2006.01)
*C10K 1/02* (2006.01)
*B01J 37/20* (2006.01)
*B01J 37/02* (2006.01)
*C10G 3/00* (2006.01)
*C01B 3/16* (2006.01)
*C10L 3/10* (2006.01)
*C10K 3/04* (2006.01)
*B01J 23/883* (2006.01)
*C10L 3/08* (2006.01)
*C10B 53/02* (2006.01)

(52) U.S. Cl.
CPC ... *C10G 2300/4006* (2013.01); *C10G 2300/4018* (2013.01); *C10B 49/10* (2013.01); *C10J 3/463* (2013.01); *C10K 1/026* (2013.01); *B01J 37/20* (2013.01); *C10J 2200/06* (2013.01); *Y02E 50/343* (2013.01); *C10K 1/024* (2013.01); *C01B 2203/0283* (2013.01); *B01J 37/0201* (2013.01); *C10G 2300/1011* (2013.01); *C10G 3/57* (2013.01); *C10G 3/46* (2013.01); *C01B 2203/0827* (2013.01); *C01B 3/16* (2013.01); *C10G 3/50* (2013.01); *C10L 3/103* (2013.01); *C10L 3/104* (2013.01); *C01B 2203/148* (2013.01); *C01B 2203/043* (2013.01); *C01B 2203/0205* (2013.01); *C01B 2203/1241* (2013.01); *C01B 2203/0811* (2013.01); *C10K 3/04* (2013.01); *C10G 3/42* (2013.01); *B01J 23/883* (2013.01); *C10G 2300/4012* (2013.01); *C10L 3/102* (2013.01); *C10J 2300/1662* (2013.01); *C01B 2203/1258* (2013.01); *C10J 2300/0916* (2013.01); *C01B 2203/0475* (2013.01); *C10B 53/02* (2013.01); *C01B 2203/042* (2013.01); *Y02E 50/14* (2013.01)
USPC ........................................................ 48/197 R

(56) References Cited

U.S. PATENT DOCUMENTS

| | | | |
|---|---|---|---|
| 3,997,423 | A | 12/1976 | Greene |
| 4,013,543 | A | 3/1977 | Greene |
| 4,166,786 | A | 9/1979 | Duraiswamy et al. |
| 4,260,473 | A | 4/1981 | Bauer |
| 4,326,944 | A | 4/1982 | Meyer et al. |
| 4,371,727 | A | 2/1983 | Gavin |
| 4,808,289 | A | 2/1989 | McDaniel et al. |
| 4,822,935 | A | 4/1989 | Scott |
| 5,055,181 | A | 10/1991 | Maa et al. |
| 5,096,569 | A | 3/1992 | Maa et al. |
| 5,605,551 | A | 2/1997 | Scott et al. |
| 7,511,181 | B2 | 3/2009 | Petri et al. |
| 7,686,856 | B2 | 3/2010 | Hemmings et al. |
| 7,982,076 | B2 | 7/2011 | Marker et al. |
| 7,994,375 | B2 | 8/2011 | Marker et al. |
| 8,003,834 | B2 | 8/2011 | Marker et al. |
| 8,084,655 | B2 | 12/2011 | Dindi et al. |
| 8,119,847 | B2 | 2/2012 | Dindi et al. |
| 2003/0130360 | A1* | 7/2003 | Kindig et al. ............... 518/703 |
| 2006/0219403 | A1 | 10/2006 | Steinberg |
| 2007/0119098 | A1* | 5/2007 | Diaz et al. .................... 48/127.3 |
| 2008/0006519 | A1 | 1/2008 | Badger |
| 2008/0053870 | A1 | 3/2008 | Marker et al. |
| 2009/0082604 | A1 | 3/2009 | Agrawal et al. |
| 2009/0084666 | A1 | 4/2009 | Agrawal et al. |
| 2009/0126274 | A1 | 5/2009 | Vogel et al. |

FOREIGN PATENT DOCUMENTS

| | | |
|---|---|---|
| JP | 2007-153928 A | 6/2007 |
| JP | 2007-308564 A | 11/2007 |
| JP | 2011-515539 A | 5/2011 |
| JP | 2011-526640 A | 10/2011 |
| RU | 2124547 C1 | 1/1999 |
| WO | 88/01611 A1 | 3/1988 |
| WO | 00/21911 A1 | 4/2000 |
| WO | 2009/029660 A2 | 3/2009 |
| WO | 2009/038965 A1 | 3/2009 |

OTHER PUBLICATIONS

Guell, A. J. et al., "Effect of H2-Pressure on the Structures of Bio-oils from the Mild Hydropyrolysis of Biomass", Biomass and Bioenergy, vol. 5, No. 2, pp. 155-171, 1993.
Rocha, J. Dilcio et al., "The Scope for Generating Bio-Oils with Relatively Low Oxygen Contents Via Hydropyrolysis", Organic Geochemistry, 30 (1999) 1527-1534.
Meier, D. et al., "Catalytic Hydroliquefaction of Spruce Wood -Elemental Balance and Effect of Catalyst-", J Wood Chem Technology, vol. 8, No. 4, 1988 pp. 523-542.
Meier, D. et al. "Direct Catalytic Liquefaction Technology of Biomass Status and Review", Biomass Pyrolysis Liquids, 1991, pp. 93-102.
Meier, D. et al. "Effect of Hydrogen Pressure on Yields and Quality of Oils Obtained from Direct Liquefaction of Pine Wood", Energy From Biomass 4, 1989, pp. 584-592.
Meier, D. et al., "High Liquid Yields from Lignin Via Catalytic Hydropyrolysis", Advances in Thermochemical Biomass Conversion, vol. 2, 1994, pp. 1016-1031.
Nikkhah, K. et al., "Co-pyrolysis of Various Biomass Materials and Coals", Energy from Biomass and Wastes, XVI, 1992, pp. 857-902.
Pindoria, R.V., et al., "A Two-Stage Fixed-Bed Reactor for Direct Hydrotreatment of Volatiles", Fuel, vol. 77, No. 15, Dec. 1998, pp. 1715-1726.
Scott, D.S., et al. "The Continuous Flash Pyrolysis of Biomass", Can J Chem Eng., vol. 62, No. 3, Jun. 1984, pp. 404-412.
Love, Gordon D. et al., "Release of covalently-bound alkane biomarkers in high yields from kerogen via catalytic hydropyrolysis", Org. Geochem., vol. 23, No. 10, pp. 981-986, 1995.
Japanese Patent Application No. 2012-504670 dated Nov. 8, 2013.
Chinese Patent Application No. 201180038507.0—Search Report dated Nov. 21, 2013.
Donald L. Klass, "Thermal Conversion: Pyrolysis and Liquefaction", Biomass for Renewable Energy, Fuels, and Chemicals, pp. 225-269, 1996.
J.D. Rocha, et al. "Hydrodeoxygenation of Oils from Cellulose in Single and Two-Stage Hydropyrolysis" Renewable Energy, vol. 9, pp. 950-953, 1996.
Ayse E. Putun, et al. "Oil Production from an arid-land plant: fixed-bed pyrolysis and hydropyrolysis of *Euphorbia rigida*", Fuel, vol. 75 No. 11, pp. 1307-1312, 1996.
European Application No. 11796075.7—Supplementary European Search Report dated Apr. 2, 2014.

* cited by examiner

METHOD FOR PRODUCING METHANE FROM BIOMASS

CROSS-REFERENCE TO RELATED APPLICATION

This application is a continuation-in-part application of our co-pending U.S. patent application Ser. No. 12/419,535, filed 7 Apr. 2009.

BACKGROUND OF THE INVENTION

1. Field of the Invention

This invention relates to an integrated process for thermochemically transforming biomass directly into methane. As used herein, the term "biomass" refers to biological material derived from living or deceased organisms and includes lignocellulosic materials, such as wood, aquatic materials, such as algae, aquatic plants, seaweed, and animal by-products and wastes, such as offal, fats, and sewage sludge. In one aspect, this invention relates to a multi-stage hydropyrolysis process for producing methane from biomass.

2. Description of Related Art

Conventional pyrolysis of biomass, typically fast pyrolysis, does not utilize or require $H_2$ or catalysts and produces a dense, acidic, reactive liquid product that contains water, oils, and char formed during the process. High yields of methane may be achieved through conventional fast pyrolysis; however, higher char yields are typically attained through fast pyrolysis in the absence of hydrogen, which decreases methane yield as compared with the method of this invention. Methane may also be produced from biomass by conventional pyrolysis and anaerobic digestion processes. In addition, gasification followed by methanation may be employed for producing methane from biomass.

SUMMARY OF THE INVENTION

It is one object of this invention to provide a method and apparatus for producing methane which provides superior methane yields when compared with conventional anaerobic digestion, gasification, or fast pyrolysis.

It is one object of this invention to provide a method and apparatus for producing methane which occupies a lower physical footprint than a comparable anaerobic digester or fast pyrolyzer. Conversion of biomass in an anaerobic digester takes a long time (20-30 days of residence time in the digester), requiring a very large anaerobic digester.

It is yet another object of this invention to provide a method and apparatus for producing methane which is less costly than conventional steam and oxygen pressurized gasification followed by methanation. Gasification is capital intensive because it is run at high temperatures, requires an air separation plant to produce the required oxygen, which air separation plant is capital intensive.

It is yet a further object of this invention to provide a method and apparatus for producing methane from biomass.

These and other objects of this invention are addressed by a multi-stage method and apparatus for producing methane from biomass comprising the steps of hydropyrolizing biomass in a hydropyrolysis reactor vessel containing molecular hydrogen and a deoxygenating catalyst at a hydropyrolysis temperature greater than about 1000° F. and a hydropyrolysis pressure in a range of about 100 psig to about 600 psig, producing a hydropyrolysis product comprising char and a gas containing a large proportion of methane, very small quantities of higher hydrocarbons including unsaturated hydrocarbons, but no tar-like material, in addition to $H_2$, CO, $CO_2$, and $H_2O$ (steam), and also $H_2S$ to the extent that there is sulfur in the feedstock, separating the char from the hydropyrolysis product, resulting in a reduced char hydropyrolysis product, and hydroconverting the reduced char hydropyrolysis product in a hydroconversion reactor vessel using a hydroconversion catalyst at a hydroconversion temperature greater than about 850° F. and a hydroconversion pressure in a range of about 100 psig to about 600 psig. Thus, a hydropyrolysis product stream containing substantial amounts of methane is produced. The hydroconversion product is cooled and introduced into a water-gas-shift reactor to convert the majority of the CO by reaction with the steam, producing a water-gas-shift product comprising steam and a gaseous mixture comprising $CO_2$, $H_2$, and methane, but with reduced levels of CO. The $CO_2$, $H_2$, and methane are then separated, producing a $CO_2$ stream, an $H_2$ stream, and a methane stream. The $H_2$ is recovered, for example, via a PSA unit, and recycled back to the hydropyrolysis unit. The methane stream is then compressed and split between a product gas which is methanated as necessary to remove any residual CO or $H_2$ or both by conversion to methane, so as to make a methane product acceptable to a pipeline carrying natural gas in the ultimate gas purchase customers thereof, and the rest of the methane is sent to the steam reformer where, after addition of appropriate levels of steam to avoid carbon formation in the catalyst tubes suspended in the furnace box of the reformer, a portion (typically 10-15%) is used as fuel to the furnace box of the reformer, and the rest is steam reformed to make hydrogen for the hydropyrolysis unit. A portion of the hydrogen stream from the reformer commensurate to the level of CO, $CO_2$, and $H_2$ entering the methanation unit prior to such hydrogen addition is introduced into the previously mentioned methanation vessel. There, hydrogen reacts with any remaining amounts of carbon oxides ($CO_2$ and CO) in the methane product stream, forming additional methane and thusly minimizing carbon oxides from the methane product stream. Multiple reactors and final stage reactors to attain the desired degree of conversion and to accommodate the heat released by the methanation reactions are provided as necessary as known to those skilled in the art.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
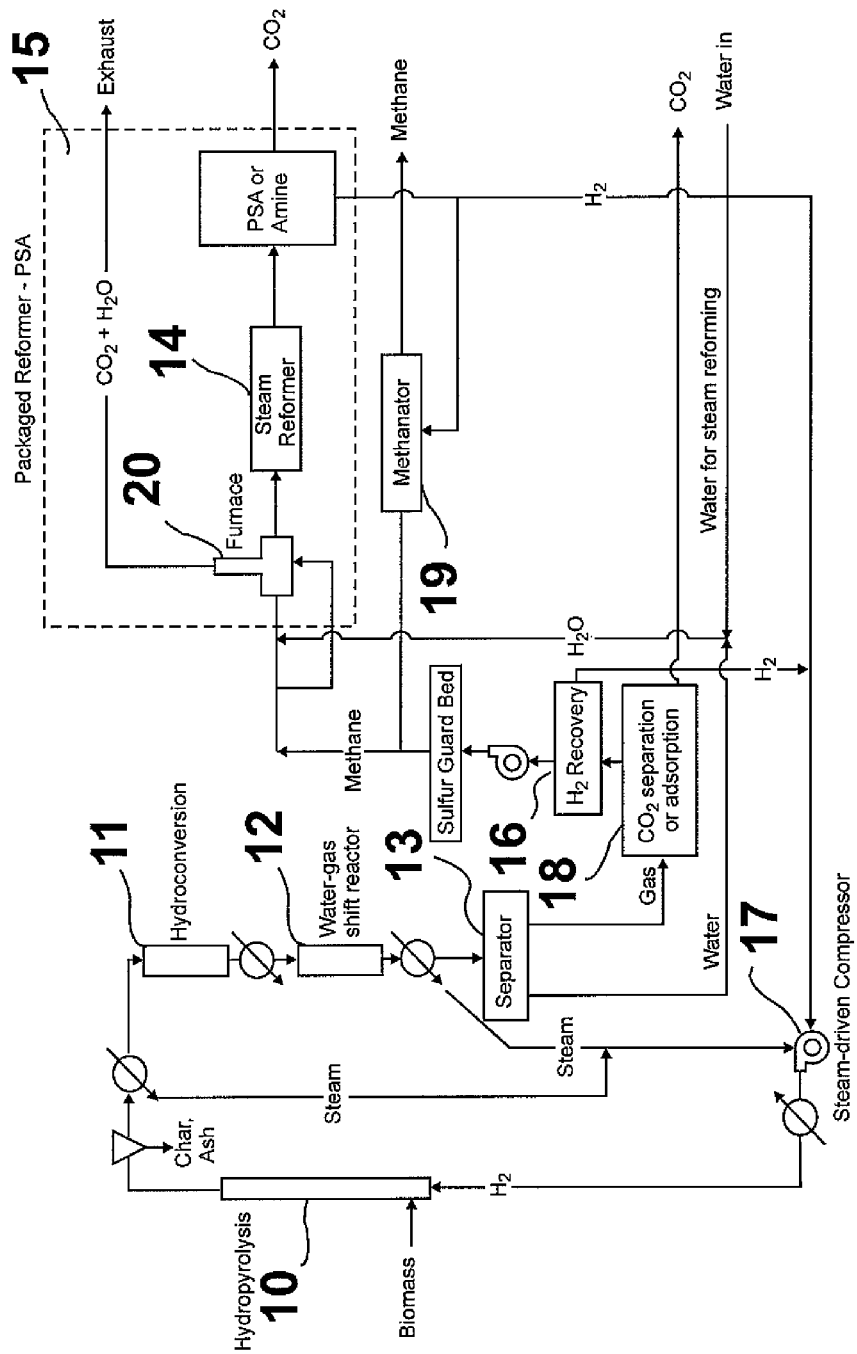
FIG. 1 is a schematic flow diagram of a process for producing methane from biomass in accordance with one embodiment of this invention.

The process of this invention, shown in FIG. 1, is a compact, integrated, multi-stage process for thermochemically transforming biomass into methane. The first reaction stage or step of this process employs a pressurized, catalytically-enhanced, hydropyrolysis reactor vessel 10 to create a low-char, partially deoxygenated, hydropyrolysis product from which the char is removed. Although any reactor vessel suitable for hydropyrolysis may be employed, the preferred reactor vessel is a fluidized bed reactor. The hydropyrolysis step employs a rapid heat up in which the average internal temperature of the particle rises at a rate of about 10,000° C./second. The residence time of the pyrolysis vapors in the reactor vessel is less than about 1 minute. In contrast thereto, the residence time of the char is relatively long because it is not removed through the bottom of the reactor vessel and, thus, must be reduced in particle size until the aerodynamic diameter of these particles is sufficiently reduced to enable them to be eluted and carried out with the vapors exiting proximate the top of the reactor vessel. The second reaction stage (subsequent to char removal) employs a hydroconversion reactor vessel 11 in which a hydroconversion step is carried out at substantially the same pressure as the first reaction stage as necessary to convert any olefins to methane. The product from the second reaction stage is then sent to a water-gas-shift reactor 12 in which the product is converted to a shift product comprising a mixture of $CO_2$, $H_2O$, $H_2$, and methane and the CO concentration is decreased. The shift product is cooled and separated into water, which is used, after water treatment, for steam reforming a portion of the methane product in steam reformer 14, which itself is a component of a packaged reformer-PSA unit 15, and gaseous fractions using high pressure separator 13. The mixture of $CO_2$, $H_2$, and methane is provided to a $H_2$ recovery unit 16 in which the $H_2$ is separated from the mixture and combined with $H_2$ from the packaged reformer-PSA unit. The $H_2$ is then compressed in steam-driven compressor 17 and recycled back to hydropyrolysis reactor vessel 10 for use in the hydropyrolysis process therein. The remaining mixture with a small amount of CO and $CO_2$ is compressed. The methane-rich stream leaving the $H_2$ separation unit 16 may still contain small amounts of CO as an impurity in excess to that allowable for the methane to be acceptable in a natural gas pipeline system. A portion of the remaining methane is provided to the methanator 19 in which any residual CO and a portion of the $H_2$ from the packaged reformer-PSA unit is reacted to produce additional methane. Depending on the level of $H_2S$, a trace sulfur removal system or guard bed may be required to protect the methanation catalyst which is poisoned by sulfur. The stream exiting the methanator 19 will be a high-purity methane stream, containing only trace amounts of CO, $CO_2$, $H_2$, and water vapor. This stream will be dehydrated and compressed to a pressure suitable for admission to the natural gas transmission or other offtake pipeline. The remaining portion of methane from $H_2$ recovery separation unit 16 is sent to the steam reformer 14 together with water as steam for conversion of methane into $H_2$ and $CO_2$. A portion of the methane gas is burned in a furnace or other combustor 20 to heat up the remaining portion of methane gas to the operating temperature of the steam reformer, which is about 1700° F. Alternatively, this furnace can be fueled using the char eliminated from the hydropyrolysis product stream downstream of the hydropyrolysis reactor 10. Steam reformers require a 3/1 steam-to-hydrocarbon ratio in their feed to avoid carbon formation and to push the reaction equilibrium to shift the CO to $H_2$, but this is far more than the amount required for the reforming reaction. The excess water is recovered, treated as necessary fort boiler feed water needs, and recycled to the steam reformer. The $CO_2$ is removed from the process by pressure swing absorption (PSA) and any $H_2$ not sent the methanator 19 is recirculated back to the first reaction stage (hydropyrolysis, occurring in the hydropyrolysis reactor 10) of the process.

A key aspect of this invention is that the heat energy required in the process is supplied by the heat of reaction of the deoxygenation reaction, which is exothermic, occurring in both the first and second stages. Another key aspect of this invention is that the biomass feed need not be severely dried and, in fact, the addition of water either in the feed or as a separate feed is advantageous to the process because it enhances in-situ $H_2$ formation through a water-gas-shift reaction.

The biomass feed utilized in the process of this invention may be in the form of loose biomass particles having a majority of particles preferably less than about 3 mm in size or in the form of a biomass/liquid slurry. However, it will be appreciated by those skilled in the art that the biomass feed may be pretreated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of carrier gas, such as inert or $CO_2$ gases and $H_2$, and constant-displacement pumps, impellers, or turbine pumps.

Hydropyrolysis is carried out in the reactor vessel at a temperature greater than about 1000° F., preferably in the range of about 1000° F. to about 1200° F., and at a pressure in the range of about 100 psig to about 600 psig. Heating rate of the biomass is preferably greater than about 10,000/second. The weight hourly space velocity (WHSV) in gm biomass/gm catalyst/hr for this step is in the range of about 0.2 to about 10.

As previously indicated, in the hydropyrolysis step of this invention, the solid biomass feed is rapidly heated, preferably in a hot fluidized bed, resulting in conversion of the biomass to non-char products comparable to and possibly better than yields obtained with conventional fast pyrolysis. However, the hydropyrolysis vapors during hydropyrolysis are in the presence of a catalyst and a high partial pressure of $H_2$ within the fluidized bed, which provides hydrogenation activity and also some deoxygenation activity. Hydrogenation activity is very desirable for preventing reactive olefins from polymerizing, thereby reducing the formation of unstable free radicals. Similarly, deoxygenation activity is important so that the heat of reaction from hydropyrolysis is supplied by the exothermic deoxygenation reaction, thereby obviating the need for external heating of the hydropyrolysis reactor. The advantage of hydropyrolysis over existing pyrolytic processes is that hydropyrolysis avoids the retrograde reactions of pyrolysis, which is usually carried out in an inert atmosphere, most certainly in the absence of $H_2$ and usually in the absence of a catalyst, thereby promoting the undesirable formation of polynuclear aromatics, free radicals and olefinic compounds that are not present in the original biomass. If hydropyrolysis is carried out at low temperatures, longer-chain molecules will tend to be produced. If hydropyrolysis is carried out at higher temperatures, these molecules will tend to be cracked, producing molecules with shorter carbon chains and increasing the proportion of methane produced during this step.

The first stage hydropyrolysis step of this invention operates at a temperature hotter than is typical of a conventional hydroconversion process, as a result of which the biomass is rapidly devolatilized. Thus, the step requires an active catalyst to stabilize the hydropyrolysis vapors, but not so active that the catalyst rapidly cokes. Catalyst particle sizes are preferably greater than about 100 micrometers. Although any size deoxygenation catalyst suitable for use in the temperature range of this process may be employed in the hydropyrolysis step, catalysts in accordance with preferred embodiments of this invention are as follows:

Glass-ceramic catalysts—Glass-ceramic catalysts are extremely strong and attrition resistant and can be prepared as thermally impregnated (i.e. supported) or as bulk catalysts. When employed as a sulfided NiMo, Ni/NiO, CoMo, or Co-based glass-ceramic catalyst, sulfur-active catalyst, the resulting catalyst is an attrition resistant version of a readily available, but soft, conventional NiMo, Ni/NiO, or Co-based catalyst. Glass-ceramic sulfided NiMo, Ni/NiO, or Co-based catalysts are particularly suitable for use in a hot fluidized bed because these materials can provide the catalytic effect of a conventional supported catalyst, but in a much more robust, attrition resistant form. In addition, due to the attrition resistance of the catalyst, the biomass and char are simultaneously ground into smaller particles as hydropyrolysis reactions proceed within the reaction vessel. Thus, the char that is ultimately recovered is substantially free of catalyst contaminants from the catalyst due to the extremely high strength and attrition resistance of the catalyst. The attrition rate of the catalyst will typically be less than about 2 weight % per hour, preferably less than 1 weight % per hour as determined in a standard, high velocity jet-cup attrition index test. Catalyst will be added periodically to make up for catalyst losses.

Nickel phosphide catalyst—Ni Phosphide catalysts do not require sulfur to work, nor are they poisoned by sulfur and therefore will be just as active in a sulfur-free environment as in an environment containing $H_2S$, COS and other sulfur-containing compounds. Therefore, this catalyst will be just as active for biomass which has little or no sulfur present as with biomass which does contain sulfur (e.g. corn stover). This catalyst may be impregnated on carbon as a separate catalyst or impregnated directly into the biomass feedstock itself.

Bauxite—Bauxite is an extremely cheap material and, thus, may be used as a disposable catalyst. Bauxite may also be impregnated with other materials such as Ni, Mo, or be sulfided as well.

Small size spray-dried silica-alumina catalyst impregnated with NiMo or CoMo and sulfided to form a hydroconversion catalyst—Commercially available NiMo or CoMo catalysts are normally provided as large size 1/8-1/16-inch tablets for use in fixed beds. In the instant case, NiMo is impregnated on spray dried silica alumina catalyst and used in a fluidized bed. This catalyst exhibits higher strength than a conventional NiMo or CoMo catalyst and would be of the right size for use in a fluidized bed.

An alumina support may also serve as a hydropyrolysis catalyst. This alumina support could be gamma alumina of an appropriate surface area and size, or have phosphorus disposed upon it as is typical for a hydrotreating catalyst support.

In between the hydropyrolysis and hydroconversion steps, char is removed from the hydropyrolysis product, typically by inertial separation, such as cyclones, or barrier filtration, such as bayonet filters. In conventional fast pyrolysis, efficient char removal is made difficult because as char is captured on the surface of a filter, it reacts with the highly-oxygenated hydrocarbon vapors resulting from pyrolysis to create tar-like hydrocarbons that coat and bind the captured char into a dense dust cake that can permanently blind hot process filters. In contrast to fast pyrolysis carried out in an inert atmosphere, in hydropyrolysis, the hydrogenated vapors that are produced are non-reactive, low molecular weight hydrocarbons that remain in a gaseous state throughout and pass through a barrier filter without reaction or deposition. Thus, in integrated hydropyrolysis and hydroconversion, char may be removed in accordance with the process of this invention by filtration from the vapor stream. Backpulsing may be employed in removing char from filters, as long as the hydrogen used in the process of this invention sufficiently hydrogenated and thus reduces the reactivity of the hydropyrolysis vapors leaving the hydropyrolysis reactor. Electrostatic precipitation, inertial separation, magnetic separation, or a combination of these technologies may also be used to remove char and ash particles from the hot vapor stream.

By virtue of their resistance to attrition, glass-ceramic catalysts are more easily separated from char by energetic inertial separation technologies that typically employ energetic impaction, interception, and/or diffusion processes sometimes combined with electrostatic precipitation to separate, concentrate, and collect char into a secondary stream for recovery. An additional virtue of these materials is that, because they are amenable to magnetic separation (in a reduced state, being attracted to a permanent or electrically-induced magnetic field), magnetic techniques as well as combinations of magnetic, inertial, and electrostatic means may be employed for separating char from these catalysts that are not possible with softer materials.

In accordance with one embodiment of this invention, hot gas filtration may be used to remove the char. In the case of hydropyrolysis, because the hydrogen has stabilized the free radicals and saturated the olefins, the dust cake caught on the filters has been found to be more easily cleaned than char removed in the hot filtration of the aerosols produced in conventional fast pyrolysis.

In accordance with another embodiment of this invention, the hot gas filtration is coupled with injection of suitable adsorbent or mixture of adsorbents for removal of certain impurities. In this embodiment, the adsorbents form a filter cake on the filter element prior to admission of gas laden with particulates, or in a second, subsequent hot gas filter where the fines/dust particles from hydropyrolysis or hydrogasification have already been removed. Cooling may be provided so as to operate the filter at the optimal conditions which remove a particular contaminant or contaminants with the selected adsorbent or adsorbents. Means are provided for pulse blowback of the accumulated adsorbent and/or adsorbent/fines cake buildup on the filter, thereby removing impurities which react at the chosen operating conditions with the adsorbents used.

After removal of the char, the output from the first reaction stage hydropyrolysis step is introduced into a second stage hydroconversion reactor vessel 11 in which it is subjected to a second reaction stage hydroconversion step to convert any olefins to methane. This step is preferably carried out at a lower temperature (850-950° F.) than the first reaction stage hydropyrolysis step and at substantially the same pressure (100-600 psig) as the first reaction stage hydropyrolysis step. The weight hourly space velocity (WHSV) for this step is in the range of about 0.2 to about 3. If the hydroconversion catalyst can be protected from poisons, catalyst life can be expected to be increased. Thus, the catalyst used in this step should be protected from Na, K, Ca, P, and other metals present in the biomass which can poison the catalyst. This catalyst also should be protected from olefins and free radicals by the catalytic upgrading carried out in the hydropyrolysis reactor. Catalysts typically selected for this step are high activity hydroconversion catalysts, e.g. sulfided NiMo and sulfided CoMo catalysts. In this second reaction stage, the catalyst may be used to catalyze a water-gas-shift reaction of $CO+H_2O$ to make $CO_2+H_2$, thereby enabling in-situ production of hydrogen, which, in turn, reduces the hydrogen required for hydroconversion. NiMo and CoMo catalysts both catalyze the water-gas-shift reaction.

In accordance with one embodiment of this invention, the biomass feed is an aquatic biomass, possibly containing a high proportion of lipids, such as algae or an aquatic plant low in lipids, such as lemna. The integrated process of this invention is ideal for aquatic biomass conversion because it may be carried out on aquatic biomass which is usually only partially dewatered and still capable of producing high quality yields of product gas.

Figure 2:
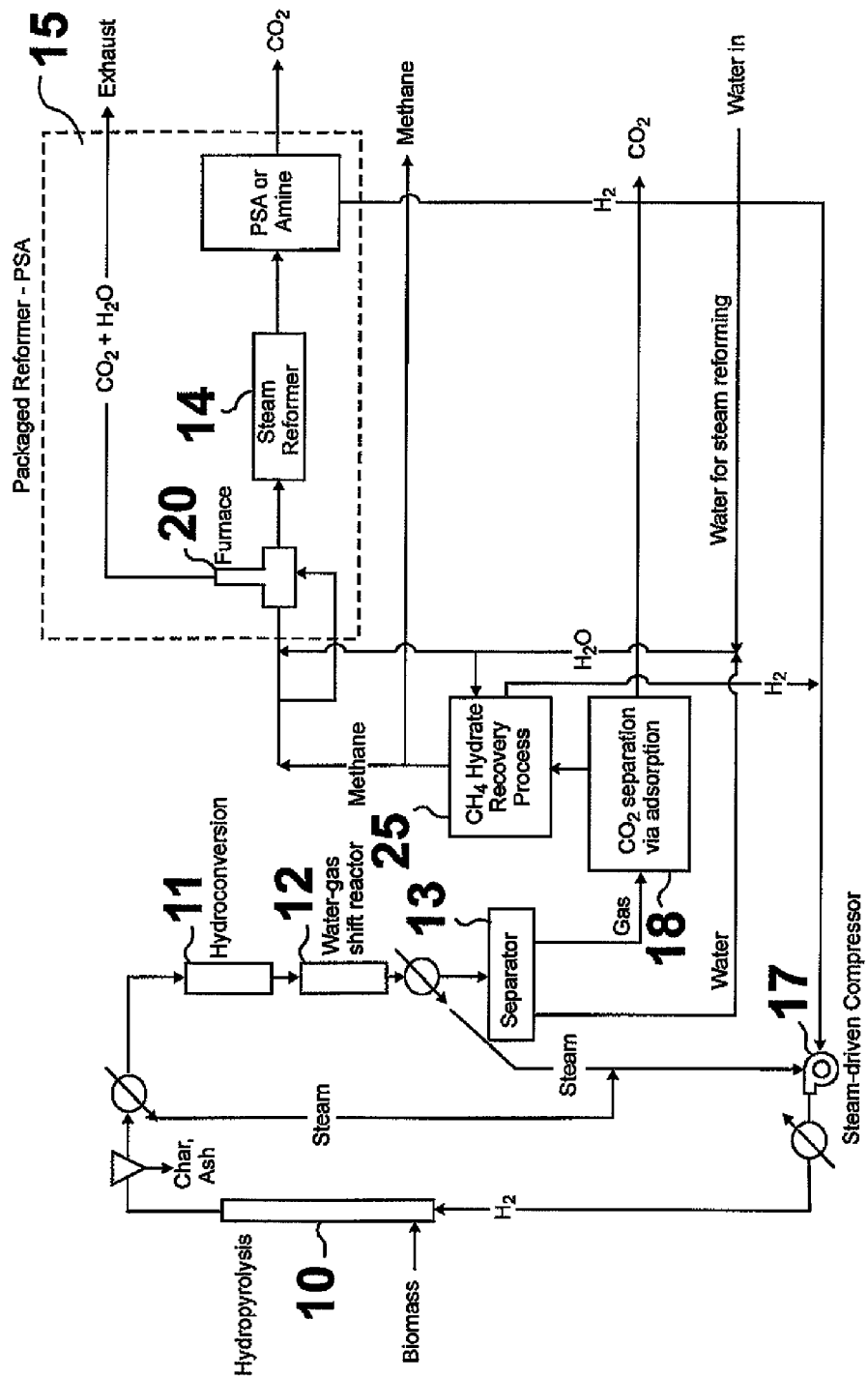
FIG. 2 is a schematic flow diagram of a process for producing methane in accordance with another embodiment of this invention.

FIG. 2 shows a further embodiment of the method of this invention in which the output from $CO_2$ separation unit 18 is provided to a methane hydrate recovery process 25 which produces a pure methane stream and a $H_2$ stream which may be recycled back to the first stage hydropyrolysis reactor vessel 10. Use of the methane hydrate recovery process eliminates the need for the methanator and produces a much purer methane product.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for producing methane from biomass comprising the steps of:
   a) hydropyrolyzing biomass in a hydropyrolysis reactor vessel containing molecular hydrogen and a deoxygenating catalyst, producing a hydropyrolysis product comprising char and vapors;
   b) separating said char from said hydropyrolysis product, producing a reduced char hydropyrolysis product;
   c) hydroconverting said reduced char hydropyrolysis product in a hydroconversion reactor vessel using a hydroconversion catalyst, producing a hydroconversion product;
   d) separating from said hydroconversion product condensed liquid water and a gaseous mixture comprising $CO_2$, $H_2$, and methane, wherein said gaseous mixture is free from char; and
   e) introducing at least a first portion of said gaseous mixture as a feed to a steam reformer, producing reformer $CO_2$ and reformer $H_2$, and
   f) introducing at least a second portion of said gaseous mixture to a methanation reactor, forming additional methane,
      wherein both hydropyrolyzing step a) and hydroconverting step c) are exothermic.

2. The method of claim 1, wherein said condensed liquid water is introduced into said steam reformer for reforming said methane.

3. The method of claim 2, wherein water from an external source is introduced into said steam reformer for reforming said methane.

4. The method of claim 1, wherein a first portion of said feed to the steam reformer is introduced into a combustor and burned, thereby heating a second portion of said feed to the steam reformer that is introduced along with steam into the steam reformer, forming said reformer CO and said reformer $H_2$.

5. The method of claim 1, wherein a portion of the char separated from hydropyrolysis products is burned in a furnace, thereby heating said feed to the steam reformer that is introduced into the stream reformer along with water, forming said reformer CO and said reformer $H_2$.

6. The method of claim 1, wherein a portion of said char is burned in a combustion chamber of a steam boiler to produce steam, which steam is introduced into the steam reformer along with said feed to the steam reformer.

7. The method of claim 1, wherein at least a portion of said reformer $H_2$ is introduced into said methanation reactor in order to form additional methane.

8. The method of claim 7, wherein said portion of reformer $H_2$ that is introduced to said methanation reactor is $H_2$ that is separated from said reformer $CO_2$ using pressure swing adsorption (PSA).

9. The method of claim 1, wherein at least a portion of said reformer $H_2$ is recycled to said hydropyrolysis reactor vessel for said hydropyrolyzing of said biomass.

10. The method of claim 1, wherein at least one of said deoxygenating catalyst and said hydroconversion catalyst is a glass-ceramic material.

11. The method of claim 1, wherein said hydropyrolysis is carried out at a weight hourly space velocity in a range of about 0.2 to about 10 gm biomass/gm catalyst/hr.

12. The method of claim 1, wherein said hydroconversion is carried out at a weight hourly space velocity in a range of about 0.2 to about 3 gm biomass/gm catalyst/hr.

13. The method of claim 1, wherein said hydropyrolysis reactor vessel is a fluidized bed reactor containing a fluidized bed.

14. The method of claim 13, wherein a gas residence time in said hydropyrolysis reactor vessel is less than about one minute.

15. The method of claim 13, wherein said char is removed from said fluidized bed reactor substantially only from above said fluidized bed.

16. The method of claim 1, wherein said hydropyrolysis reactor vessel is a fluidized bed reactor containing a fluidized bed and said char is removed from said fluidized bed reactor by energetic char separation employing at least one of an inertial, electrostatic, and magnetic process.

17. The method of claim 1, wherein said deoxygenation catalyst is selected from the group consisting of sulfide CoMo, sulfide NiMo, catalytically-active glass-ceramics, bauxite, char, and mixtures and combinations thereof.

18. The method of claim 1, wherein a hot gas filter preheated by injection of mixtures or single selected adsorbents is used to remove selected impurities from the gas exiting one of the hydropyrolysis reactor vessel and the hydroconversion reactor vessel.

19. The method of claim 1, wherein said gaseous mixture comprising $CO_2$, $H_2$, and methane that is separated in step (d) is a product of a water-gas shift reaction performed on gases of said hydroconversion product.

20. The method of claim 1, wherein said gaseous mixture comprising $CO_2$, $H_2$, and methane that is separated in step (c) is a product of a water-gas shift reaction performed on gases of said hydroconversion product.

21. A hydropyrolysis process comprising:
   a) hydropyrolyzing biomass in a fluidized bed hydropyrolysis reactor in the presence of a deoxygenating catalyst and using a hydrogen-containing gas for fluidization to produce a hydropyrolysis product;
   b) hydroconverting the hydropyrolysis product in a hydroconversion reactor in the presence of a hydroconversion catalyst and hydrogen to produce a hydroconversion product;
   c) separating condensed liquid water and a gaseous mixture comprising $CO_2$, $H_2$, and methane from the hydroconversion product; and
   d) introducing at least a first portion of said gaseous mixture to a methane hydrate recovery process to produce a purified methane stream and hydrogen that is recycled to the hydropyrolysis reactor,
      wherein both hydropyrolyzing step a) and hydroconverting step b) are exothermic.

22. The method of claim 21, further comprising introducing at least a second portion of said gaseous mixture as a feed to a steam reformer, producing reformer $CO_2$ and reformer $H_2$.

23. The method of claim 22, wherein said condensed liquid water is introduced into said steam reformer for reforming said methane.

24. The method of claim 22, wherein a first portion of said feed to the steam reformer is introduced into a combustor and burned, thereby heating a second portion of said feed to the steam reformer that is introduced along with steam into the steam reformer, forming said reformer CO and said reformer $H_2$.

25. The method of claim 22, wherein at least a portion of said reformer $H_2$ is recycled to said hydropyrolysis reactor vessel for said hydropyrolyzing of said biomass.

26. The method of claim 21, wherein a hot gas filter preheated by injection of mixtures or single selected adsorbents is used to remove selected impurities from the gas exiting one of the hydropyrolysis reactor and the hydroconversion reactor.

\* \* \* \* \*